United States Patent
Goldstein

(10) Patent No.: US 9,020,974 B2
(45) Date of Patent: Apr. 28, 2015

(54) METHOD OF SUBMITTING INFORMATION TO A DATABASE CONCERNING A STOPPED VEHICLE

(71) Applicant: Michael Goldstein, Los Angeles, CA (US)

(72) Inventor: Michael Goldstein, Los Angeles, CA (US)

(*) Notice: Subject to any disclaimer, the term of this patent is extended or adjusted under 35 U.S.C. 154(b) by 161 days.

(21) Appl. No.: 13/916,990

(22) Filed: Jun. 13, 2013

(65) Prior Publication Data

US 2014/0317052 A1 Oct. 23, 2014

Related U.S. Application Data

(60) Provisional application No. 61/813,167, filed on Apr. 17, 2013.

(51) Int. Cl.
*G06F 17/30* (2006.01)
*G06Q 50/26* (2012.01)
*G06Q 10/10* (2012.01)

(52) U.S. Cl.
CPC ............. *G06Q 50/26* (2013.01); *G06F 17/30* (2013.01); *G06Q 10/10* (2013.01)

(58) Field of Classification Search
CPC .............................. G06F 17/30; G06Q 50/26

USPC ................................................. 707/600–899
See application file for complete search history.

(56) References Cited

U.S. PATENT DOCUMENTS

| | | | |
|---|---|---|---|
| 5,097,349 A | 3/1992 | Nomura | |
| 5,459,304 A | 10/1995 | Eisenmann | |
| 5,467,329 A | 11/1995 | Hashimoto | |
| 5,619,731 A | 4/1997 | Jenkins | |
| 5,729,741 A | 3/1998 | Liaguno | |
| 5,790,548 A | 8/1998 | Sistanizadeh | |
| 6,052,068 A | 4/2000 | Price | |
| 6,224,109 B1 | 5/2001 | Yang | |
| 6,317,779 B1 | 11/2001 | Gile | |
| 6,338,405 B1 | 1/2002 | Yoerg et al. | |
| 7,079,007 B2 | 7/2006 | Siegel | |
| 7,193,532 B1 * | 3/2007 | Goldstein | 340/999 |
| 2005/0278082 A1 | 12/2005 | Weekes | |

* cited by examiner

Primary Examiner — Isaac M Woo
(74) Attorney, Agent, or Firm — Trojan Law Offices

(57) ABSTRACT

A law enforcement officer involved in a traffic stop is provided with a means to submit details of contraband locations within the stopped vehicle to a cloud-based server or database. This method of submitting information allows any other officer to be able to retrieve up-to-date information regarding the location of contraband hidden with a particular vehicle. The data submitted, stored, and accessed from the cloud-based server or database may include methods and instructions for accessing the hiding places, or other relevant information useful for an officer to retrieve contraband.

13 Claims, 3 Drawing Sheets

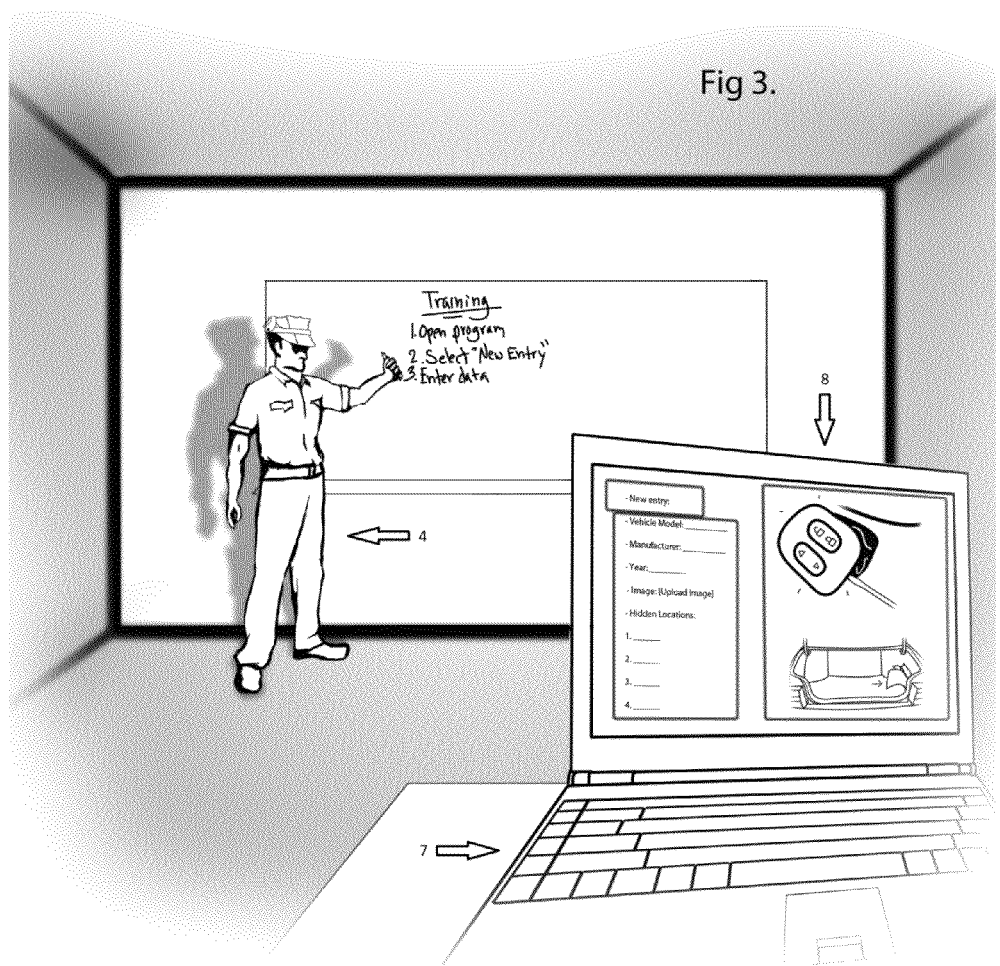

METHOD OF SUBMITTING INFORMATION TO A DATABASE CONCERNING A STOPPED VEHICLE

CROSS-REFERENCE TO RELATED APPLICATION

This application claims the benefit of U.S. Provisional Application No. 61/813,167, filed Apr. 17, 2013.

BACKGROUND OF THE INVENTION

1. Field of the Invention

This invention is directed to a method of submitting the location of contraband, and more particularly, a method of submitting and updating of the location of contraband in a vehicle using a cloud-based server or database.

2. Description of the Related Art

Law enforcement officers are often challenged with criminals attempting to outsmart officers by routinely hiding drugs, weapons, money and various forms of contraband within vehicles. The officer's challenge is to stay a step ahead of the criminals and use the information they have obtained in the field to properly search vehicles and find illegal items hidden by criminals.

Officers often rely on their own experience in determining the location of contraband within a car, yet the criminals are much more attune to the intricacies of their own car, and may know of particularly good hiding places within their specific vehicle. A law enforcement officer may only know generally the places where criminals usually hide contraband, but not know every possible hiding place in a specific car. This lack of specific vehicle knowledge leads to an advantage for the criminal who wishes to hide contraband in his or her own car.

A pool of knowledge of contraband hiding places with a vehicle would be a great advantage to law enforcement. Pooled knowledge methods have previously been described, such as U.S. Pat. No. 7,193,532 to Goldstein. Goldstein describes a system and method where an officer can view information on a compact disc (CD) that contains information concerning the location in the vehicle of potential hiding places, a method of accessing the hiding places, and tools required to access each hiding place. Officers can contact other officers to inform them of any new hiding places that the officer has found. Disadvantageously, updating information on local storage systems may erase useful data already stored, and may be difficult to integrate new data into old data. Therefore, methods that allow easy and reliable updating of contraband locations are still highly desired.

SUMMARY OF THE INVENTION

In accordance with the present invention, applicant provides a system and method for aiding law enforcement officers in conducting vehicle searches.

In a typical scenario of one embodiment of the present invention, an officer pulls over a vehicle and finds contraband hidden in a compartment in or outside the vehicle. The officer is able to add the location and compartment information to a database to help further search operations. The officer's information is submitted to a cloud-based server where the data is used for future reference when another officer searches a similar vehicle. Cloud-based databases, also known more broadly as cloud computing are known in the art. Cloud-based computing involves several computers connected through a communication network. As one user on the cloud network updates information, all other users on the network can receive the updated information. Users of cloud services also have the ability to run a program or search a database on many connected computers at the same time.

The system and method includes the officer's participation and assistance of inputting information into a database through various methods of communication including but not limited to calling dispatch, uploading text, pictures or video via a mobile device, tablet, smartphone, or laptop to aggregate data depicting known and unknown hiding spots within a vehicle requiring search. In one embodiment, the information concerning a vehicle may be recorded on video recording device, which records the locations of contraband, as well as records the steps of opening hidden compartments. The video recording device may be a camcorder, cell phone, or video recording enabled pair of glasses worn by the officer. Once the officer takes the video, the video may thereafter be submitted and stored on a database for other officers to retrieve and view. Or the video may be streamed in real time for storage in the database and/or viewed in real time by other officers. The recorded data tells other officers the hiding locations of where contraband has previously been hidden, or hiding locations where it appears likely that such locations might be used to hide contraband, including compartments that are part of the original car design, as well as customized post-manufactured compartments.

An embodiment of the present invention is a method that includes a step inputting data regarding each of a plurality of vehicles. The data may include information such as: locations of potential hiding places for illegal items, a method of accessing each hiding place, and tools required to access each hiding place. The method includes the addition step of submitting the data to a cloud based-server or database; and providing a means for accessing the database. Submitting the data to a cloud-based server or database is advantageous over other methods because the cloud-based server or database allows for continuous updating of known hiding places for illegal items. A further step for the method includes providing a means for accessing the database having contraband hiding location information. This database can be continuously updated anytime an officer finds and enters a new hiding place of contraband. As soon as the officer submits new data, any other officer connected to the cloud-based server or database immediately has access to the new known hiding places of contraband.

In some embodiments, the officer can relay this information using a smartphone, tablet, computer, mobile device, camera or camcorder to capture the location of the hiding spot or compartment and can input and upload this data to a cloud-based server, database or application, where the data can be analyzed, categorized, aggregated, classified, and categorized based on vehicle make, model and year, vehicle identification number, license plate or any combination of variables that distinguish one car from another. An officer can retrieve information from this cloud-based server or database during a traffic stop. This information is up to date with all the previous information previously submitted by other officers who have searched for and found contraband in similar vehicles.

BRIEF DESCRIPTION OF THE DRAWINGS

FIG. 3 illustrates an instructor offering training and a computer depicting a device for entry and classification of stored data.

DETAILED DESCRIPTION OF THE INVENTION

The invention now will be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art.

The terminology used herein is for the purpose of describing particular embodiments only and is not intended to be limiting of the invention. As used herein, the singular forms "a," "an," and "the," are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

The drawings will help illustrate features and advantages of the invention and will show the functionality and purpose of officers updating and submitting data to a database of where illegal items are potentially hidden in a vehicle.

Referring to the Figures, it can be understood that the embodiments relate to a method for adding and submitting data regarding potential hiding spots of illegal items into a database. The database benefits law enforcement, border patrol and dispatch that utilize these embodiments to prevent crime and aid in apprehension of criminals and/or terrorists.

Figure 1:
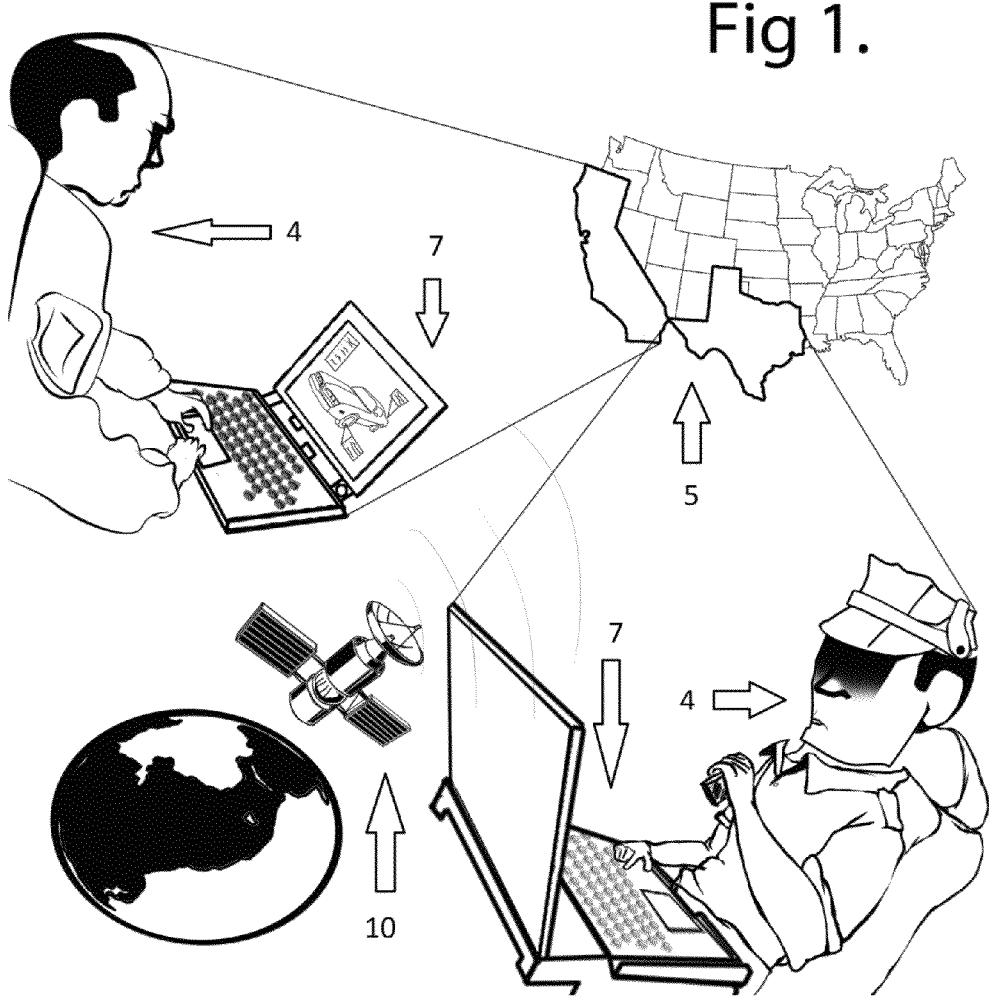
FIG. 1 is an illustration of two officers in communication with each other in different states using a vehicular search database interlinking law enforcement across multiple locations.

FIG. 1 depicts two officers unified by a database and using new discoveries of data entered by the officers in different locations to build a database of obvious, hidden, and custom compartments where suspects and criminals hide illegal items. Methods of obtaining a list of hidden areas using a computer and database have been previously described in U.S. Pat. No. 7,193,532 to Goldstein, fully incorporated herein by reference in its entirety.

In FIG. 1, an officer 4 locates illegal items or a compartment that stores illegal items in a vehicle. The officer uses a wireless network connection 10 to share information with other officers 4 in different locations 5. The inputting of information to a database or cloud service by an officer 4 is advantageous regarding discoveries of compartments previously unknown by law enforcement because the information in the database or cloud service can be updated and retrieved in real-time by officers anywhere in the world. Cloud technologies have been used in the art to link users of a database or computer program to a central server that can be used and updated by different users from several different locations. This technology has been described in other patents, such as U.S. Pat. No. 5,790,548 to Sistanizadeh et al., fully incorporated in its entirety herein by reference. The database or cloud service gathers information and becomes shared information across a wireless network 10. In the embodiment of FIG. 1, each officer 4 has his or her own user login name and password in order to identify the officer and validity the credibility of the officers' findings. The officer 4 can use various methods to input data, including, but not limited to, inputting data on devices such as a computer, laptop, mobile device, smartphone, tablet, etc. The computer program may be a cloud-based application or cloud-based database accessible through a web browser, desktop or mobile device.

Figure 2:
FIG. 2 is an illustration of an officer standing outside a suspect's vehicle after searching the vehicle, depicting the officer using a device that allows new discoveries of data to be inputted into a database where information is stored.

FIG. 2 illustrates an officer entering data for storage in a handheld device 3. In this embodiment, the officer is entering data about the car, including VIN number, hiding places (such as in the glove compartment, under the chassis, over the tire, under seats, hatch, trunk, behind upholstery, chamber behind the hubcaps, steering wheel, etc.), as depicted in the caption statement 6, detailing where the officer found contraband). Data such as how the compartments can be accessed (including any special tools needed), also would be stored in the database. The officer's 5 role of inputting data is necessary in keeping an accurate and up-to-data database so that other officers can have accurate and current information, if and when those other officers search a similar vehicle.

FIG. 3 illustrates additional uses and methods of sharing information regarding stopped vehicles. In this embodiment, a law enforcement officer 4 is shown training other law enforcement personnel how to enter data into the database. This figure illustrates a computer 7 and a display 8 with a vehicle trunk open and exposing hidden compartments. A window relay switch is displayed to show an example of car components altered or unfastened to access openings where illegal items were previously hidden, and an officer can take photographs to submit to the database the location of currently found contraband. The display 8 is also used to show the procedure for entering new data of hiding locations. New data may include additional lines for descriptive notes, including detailed location information, tools used to access these locations, and vehicle description. The newly added data can be aggregated by the cloud-based server or database into a databank of vehicle information that stores the contraband hiding location, and means to retrieve the contraband from the vehicle. The cloud-based server or database storing the vehicle information has the advantage of being capable continuous aggregation, and continuous updating by more than one officer that may be located in different locations.

I claim:

1. A method of assisting a law enforcement officer during a traffic stop, comprising:
   a) inputting data regarding each of a plurality of vehicles, the data including:
      (1) locations of potential hiding places for illegal items,
      (2) a method of accessing each hiding place, and,
      (3) tools required to access each hiding place,
   b) submitting the data to a cloud-based server or database,
   c) providing a means for accessing said database,
   whereby submitting the data to a cloud-based server or database allows for continuous updating of any computer networked to the cloud-based server or database for known hiding places of illegal items.

2. The method of claim 1, further comprising the step of an officer updating said database.

3. The method of claim 1, wherein the step of storing the data further includes storing said data on a cloud-based server.

4. The method of claim 1, further comprising the step of inputting a personal code and a login password to access the data.

5. The method of claim 1, wherein the data is sorted by classification of vehicle identification number or license plate number.

6. The method of claim 1, wherein the step of submitting the data to a cloud-based server or database is submitting the data to a law enforcement central dispatch, and further comprising the step of the law enforcement central dispatch updating a plurality of linked databases.

7. The method of claim 6, wherein at least one of the pluralities of linked databases is in possession of a law enforcement officer substantially near a vehicle having compartments for hiding contraband.

8. The method of claim 1, further comprising the step of accessing said database in order to determine the location of illegal items.

9. The method of claim 1, further comprising the step of aggregating the data submitted by a plurality of individuals, wherein the aggregated databank of hiding places for a particular vehicle, is capable of being continuously aggregated and continuously updated by a plurality of individuals situated at more than one location.

10. The method of claim 1, wherein submitting the data to a cloud-based server or database is accomplished via a mobile device, laptop, or desktop computer.

11. The method of claim 1, wherein submitting the data is accomplished via a wireless network.

12. The method of claim 1, further comprising the step of recording the data via a video recording device.

13. The method of claim 12, wherein the video recording device is a camcorder, cell phone, or a video recording enabled pair of glasses.

* * * * *